United States Patent [19]

Boe et al.

[11] Patent Number: 4,837,691
[45] Date of Patent: Jun. 6, 1989

[54] HITCH CONTROL SYSTEM WITH START-UP LOCK-OUT

[75] Inventors: Thomas E. Boe, Cedar Falls; Richard L. Sweet, Waterloo, both of Iowa

[73] Assignee: Deere & Company, Moline, Ill.

[21] Appl. No.: 54,658

[22] Filed: May 27, 1987

[51] Int. Cl.⁴ .................. A01B 63/112; A01B 63/114
[52] U.S. Cl. .................... 364/424.05; 172/3; 172/7; 172/10
[58] Field of Search ............... 280/186; 172/3, 7, 9, 172/10; 364/424, 160, 180, 561, 433

[56] References Cited

U.S. PATENT DOCUMENTS

| | | | |
|---|---|---|---|
| 4,343,365 | 8/1982 | Kajagopal et al. | 172/9 |
| 4,454,919 | 6/1984 | Arnold et al. | 364/433 |
| 4,495,577 | 1/1985 | Strunk et al. | 364/424 |
| 4,508,176 | 4/1985 | Wiegardt et al. | 172/7 |
| 4,518,044 | 5/1985 | Wiegardt et al. | 172/7 |
| 4,571,500 | 2/1986 | Mucheyer | 172/10 |
| 4,715,012 | 12/1987 | Mueller | 364/424 |

FOREIGN PATENT DOCUMENTS

0153102 8/1985 European Pat. Off. .
2093676 9/1982 United Kingdom .

Primary Examiner—Parshotam S. Lall
Assistant Examiner—Ellis B. Ramirez

[57] ABSTRACT

A hitch control system includes an algorithm which prevents undesired and/or unexpected hitch movement upon start-up of the control system, depending upon the actual hitch position, the commanded hitch position and an operator set limit position.

7 Claims, 7 Drawing Sheets

HITCH CONTROL SYSTEM WITH START-UP LOCK-OUT

BACKGROUND OF THE INVENTION

This invention relates to a control system for controlling the working depth of a tractor-coupled implement as a function of various sensed and operator-controlled parameters, and in particular, to the start-up operation of such a system.

When an electrohydraulic hitch control system is turned off, the operator controls can be moved without a corresponding movement of the controlled hitch. This can cause an unexpected hitch movement when the system is repowered. A prior hitch control system is described in U.S. application, Ser. No. 873,858, filed June 11, 1986, now U.S. Pat. No. 4,677,542, a continuation of Ser. No. 578,702, now U.S. Pat. No. 4,517,158, filed Feb. 10, 1984. This system includes a startup feature wherein inadvertent hitch movement is prevented upon start-up unless the actual hitch position is matched by the position of the hitch control lever. Another prior hitch control system is described in assignee's U.S. Pat. No. 4,518,044. This system controls the tractor hitch in response to sensed and commanded draft force, sensed and commanded hitch position, sensed engine speed and sensed wheel slip. In such a system, it would also be desireable to prevent inadvertant hitch movement by preventing hitch movement upon system start-up unless certain conditions are met.

SUMMARY OF THE INVENTION

An object of the present invention is to prevent undesired and/or unexpected hitch movement upon start-up of a hitch control system.

Another object of the present invention is to prevent hitch movement even under circumstances where hydraulic valve leakage would otherwise allow hitch movement.

Another object of the present invention is to prevent hitch movement if, upon system start-up, the hitch is beyond desired position limits set by the operator.

A further object of the present invention is to prevent hitch movement upon system start-up, if, during system shutdown, the operator controls were changed.

These and other objects are achieved by the present invention wherein a microprocessor based hitch control system includes a start-up, lock-up algorithm which prevents undesired and/or unexpected hitch movement upon start-up of the control system.

The start-up, lock-out algorithm will prevent hitch movement at start-up due to hitch position changes or hitch operator lever changes which occur when the control system is not powered. This algorithm will not only prevent movement due to a mismatch between the position of the lever and the hitch, but it will also minimize movement due to valve leakage. Unlocking of the hitch is achieved by causing the commanded position of the hitch to move through the hitch start-up position, or by moving the hitch operator control lever to either stop and allowing the hitch position to move to that stop. If the operator lever is at either stop when start-up occurs, the lever must be moved away from the stop and then back to it to cause the hitch to move.

This start-up, lock-out algorithm will also prevent hitch movement due to changes in the upper limit control during shut down. If the hitch is above the upper limit at start-up, the upper limit will not move the hitch until the operator moves the hitch below the upper limit or until the operator adjusts the upper limit to be above the hitch position.

A high control system may include switches located away from the tractor cab so that an operator outside the cab can raise and lower the hitch by operating such switches. The present start-up, lock-out algorithm does not interfere with the operation of such switches.

DETAILED DESCRIPTION

Figure 1:
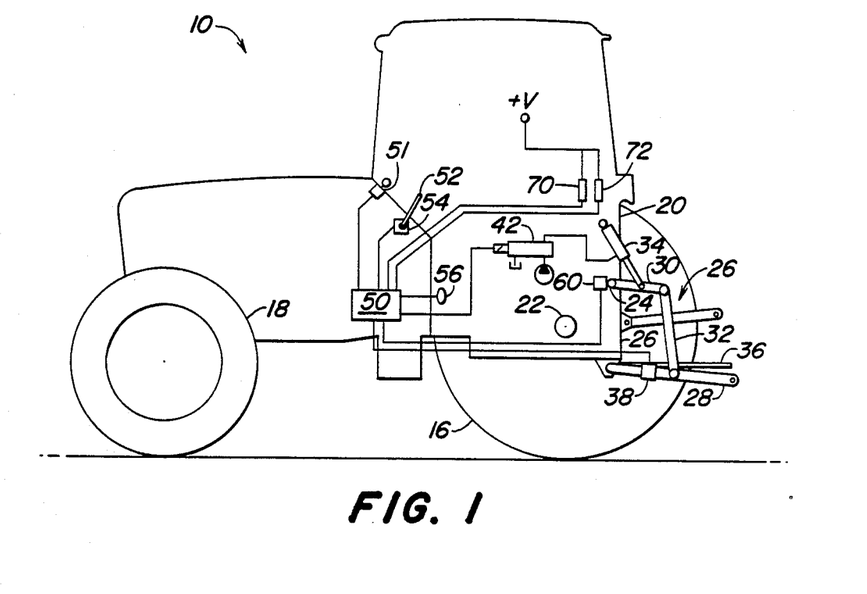
FIG. 1 is a simplified schematic of an agricultural tractor equipped with the present invention.

A tractor 10 includes a rear housing 20 which supports a rear axle 22 and rockshaft 24. An implement hitch 26, such as a conventional 3-point hitch, includes draft links 28 which are connected to lift arms 30 via lift links 32. The lift arms 30 are connected to the rockshaft 24 to insure simultaneous and equal movement and are raised and lowered via a pair of parallel connected hydraulic lift or rockshaft cylinders 34. A draftbar 36 extends rearwardly from the housing 20. A tractor 10 and the hitch 26 are merely exemplary and those skilled in the art will understand that the invention can be applied to tractors and hitches of other configurations. For example, this invention can be used on an articulated four-wheel drive tractor or on a front-wheel drive row-crop tractor.

An integral-type, ground-engaging inplement (not shown), such as a moldboard plow or a chisel plow, may be attached in a conventional manner to the draft links 28. Alternatively, a towed implement (not shown) may be coupled to the drawbar 36. Draft sensors 38 may be interposed in the hitch 26, for example, in the draft links 28, to sense the draft force transmitted to the draft links 28 from the integral implement. If a plurality of draft sensors are interposed in the hitch 26, then a single draft representative signal may be obtained by combining together the separate signals from the plurality of sensors 38. In the case of a towed implement, the draft force may be sensed with a draft sensor interposed in the drawbar 36, or with a T-bar coupled to the draft links. In either case, any suitable known draft sensor would suffice.

The communication of hydraulic fluid to and from the cylinder 34 or to and from a remote cylinder (not shown) on a towed or semi-integral implement is controlled by a conventional solenoid-operated electrohydraulic flow control valve 42 which receives electrical control signals generated by a control unit or central processing unit 50, which may include a digital microprocessor, analog-to-digital converters, multiplexers and/or other equivalent conventional hardware components. The flow control valve 42 may be comprised of a commercially available MOOG-type servo-valve with a torque motor-operated pilot stage and an integral second stage. The output hydraulic flow rate is substantially proportional to the magnitude of the electrical current applied to the torque motor of the valve 42.

Figure 3:
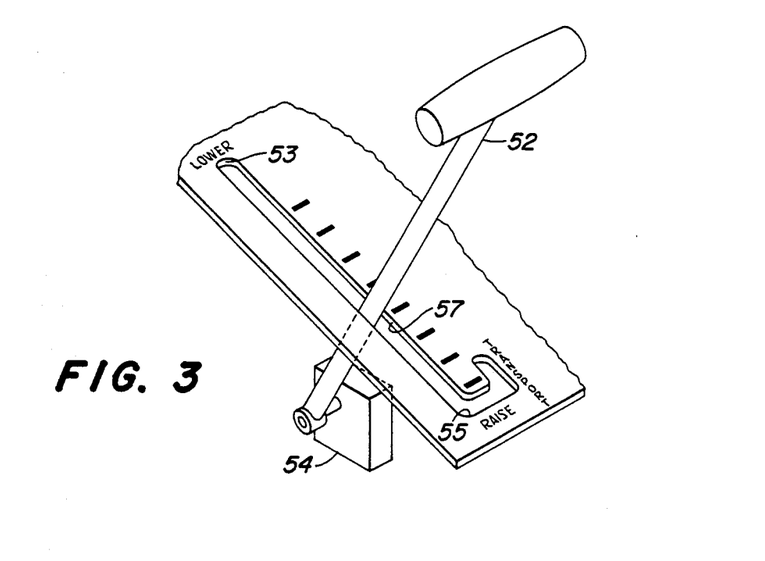
FIG. 3 is a detailed view of the operator-controlled lever of FIG. 1.

An operator-controlled position/load command lever 52 is coupled to a lever transducer 54 (such as a potentiometer) which generates a command signal which represents a desired hitch position or a desired draft load, depending upon the setting of a position/load control mode switch 56. An electrical upper position limit signal is provided by an operator-adjustable potentiometer 51. The lever 52 moves within a slot 57. The ends 53 and 55 of this slot act as lower and upper mechanical stops, respectively, which mechanically limit the position of control lever 52 and thus, limit the signal from potentiometer 54.

A position transducer 60, such as a conventional rotary potentiometer, generates a sensed position signal which represents the actual sensed position of the rockshaft. a position feedback signal could also be obtained from the lift cylinder 34 or from a remote lift cylinder if that cylinder includes a position transducer, such as described in U.S. Pat. No. 3,726,191, for example.

The above-described hardware elements, as well as the algorithm features described below, may be combined with other hitch control elements as are described in U.S. Pat. No. 4,518,044, which is incorporated by reference herein.

Also, a pair of raise and lower switch 70, 72 may be mounted outside of the tractor cab near the hitch 26 so that an operator can raise and lower the hitch from outside the tractor cab.

Figure 2A:
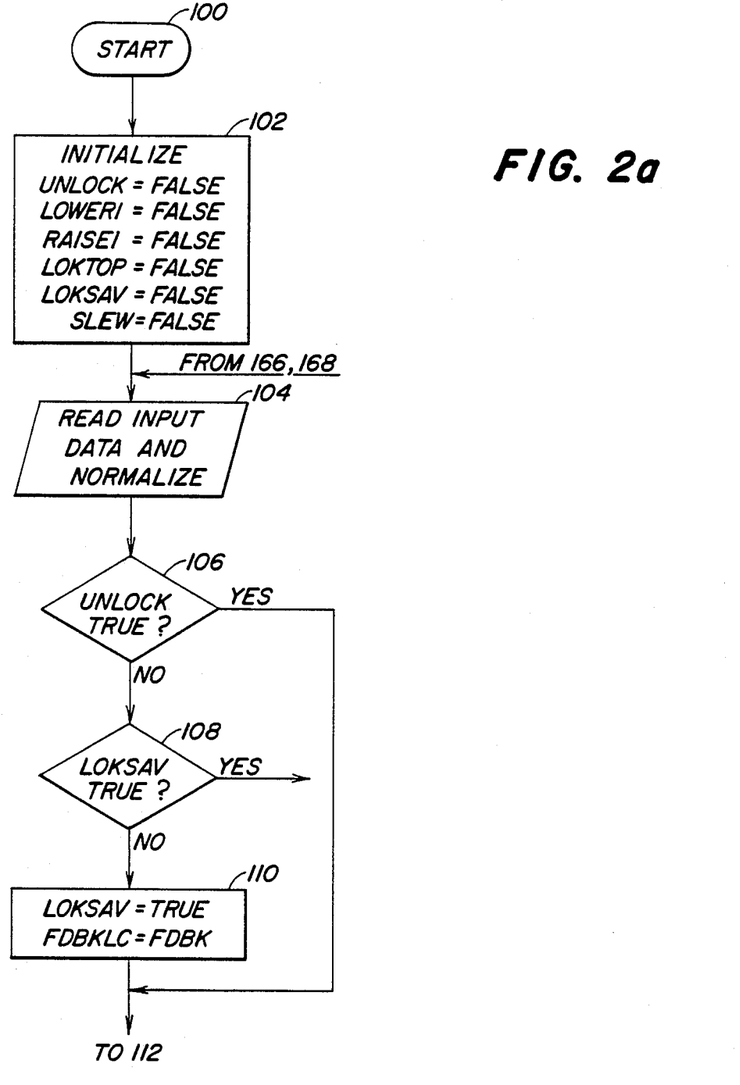
FIGS. 2a–2f are flow charts of the algorithm performed by the central processing unit of FIG. 2.

The control algorithm which is executed by the control unit 50 is shown in FIGS. 2a-2f. The algorithm starts at step 100, after which, in step 102, various variables are initialized, as follows:

UNLOCK (false)—Indicates hitch is unlocked
LOWER1 (false)—Indicates hitch command has been lowered since start-up
RAISE1 (false)—Indicates hitch command has been raised since start-up
LOKTOP (false)—Indicates hitch upper limit is unlocked
LOKSAV (false)—Indicates hitch position at start-up has been saved
SLEW (false)—Indicates hitch position slew will be allowed In step 104, the hitch control inputs are read and normalized so that all inputs will range from 0 to 255 units. The hitch inputs of interest to the start-up, lockout algorithm are as follows:

FDBK—Hitch position feedback
LEVER—Hitch command lever
COMMAND—Hitch position command determined from lever 52
TOP—Hitch upper limit control Steps 106-110 will determine if the hitch position (FDBK) at start-up needs to be saved and save it into FDBKLC, if necessary. This is done by checking if the hitch is unlocked and if the hitch position has been previously saved. Step 106 checks the UNLOCK flag to determine if the hitch is unlocked and step 108 tests LOKSAV to determine if the hitch position has been saved. If neither is true, step 110 saves the hitch position (FDBK) at start-up into FDBKLC.

Figure 2B:
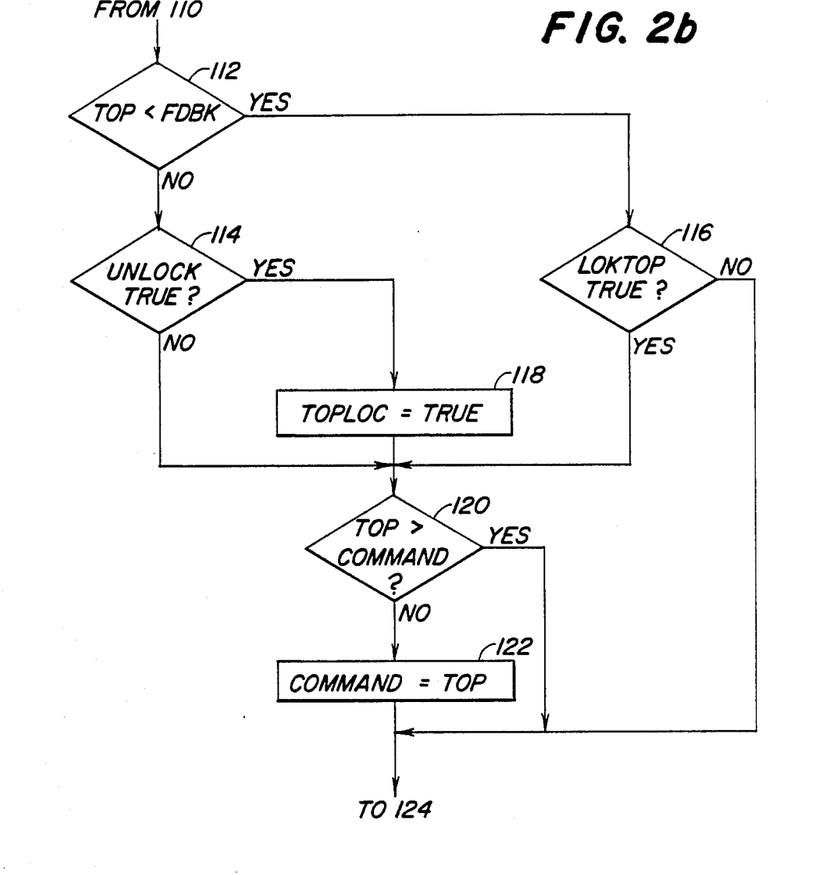

Steps 112 through 122 check the hitch upper limit (TOP) to determine if it should be used as the command limit (unlocked). This is done by determining if the hitch is below the upper limit and unlocking the top if it is. Step 112 tests to determine if the upper limit established by potentiometer 51 (TOP) is less than (below) the hitch position (FDBK) and branches to step 116 if it is or to step 114 if it is not. If the upper limit is above the hitch position, the hitch command (COMMAND) will be limited to the upper limit (TOP) at step 120 and 122.

However, if the lever has been unlocked (UNLOCK=true, step 114), then the upper limit is also unlocked (TOPLOC=true, step 118) prior to limiting the command. If the hitch is above the upper limit, then the command will be limited (step 120 and 122) only if the upper limit is unlocked (TOPLOCK=true, step 116).

Figure 2C:
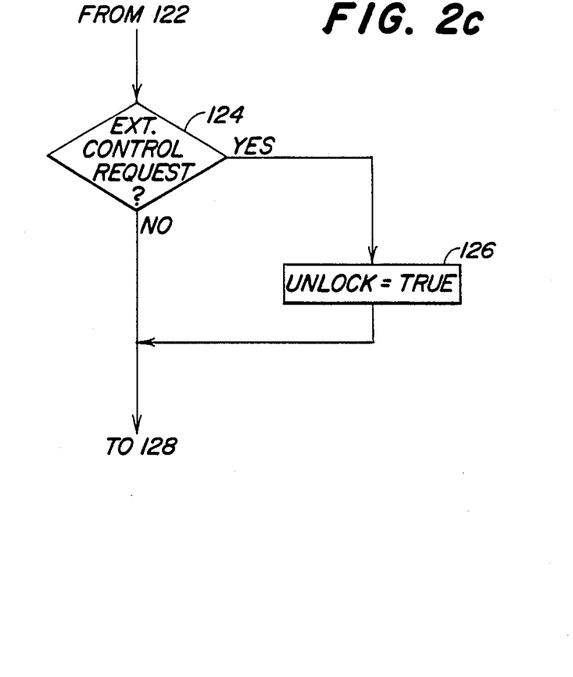

Step 124 and 126 will unlock the hitch anytime the external switches 70, 72 are used.

Steps 128 through 144 and 146 will move the hitch toward the position represented by the lever 52 whenever the lever is moved to either stop 53, 55. This is done by checking to see if the lever has ever been away from the stop (SLEW=true) and then incrementing (or decrementing) the start-up position of the hitch (FDBKLC) if the lever is at the stop.

Figure 2D:
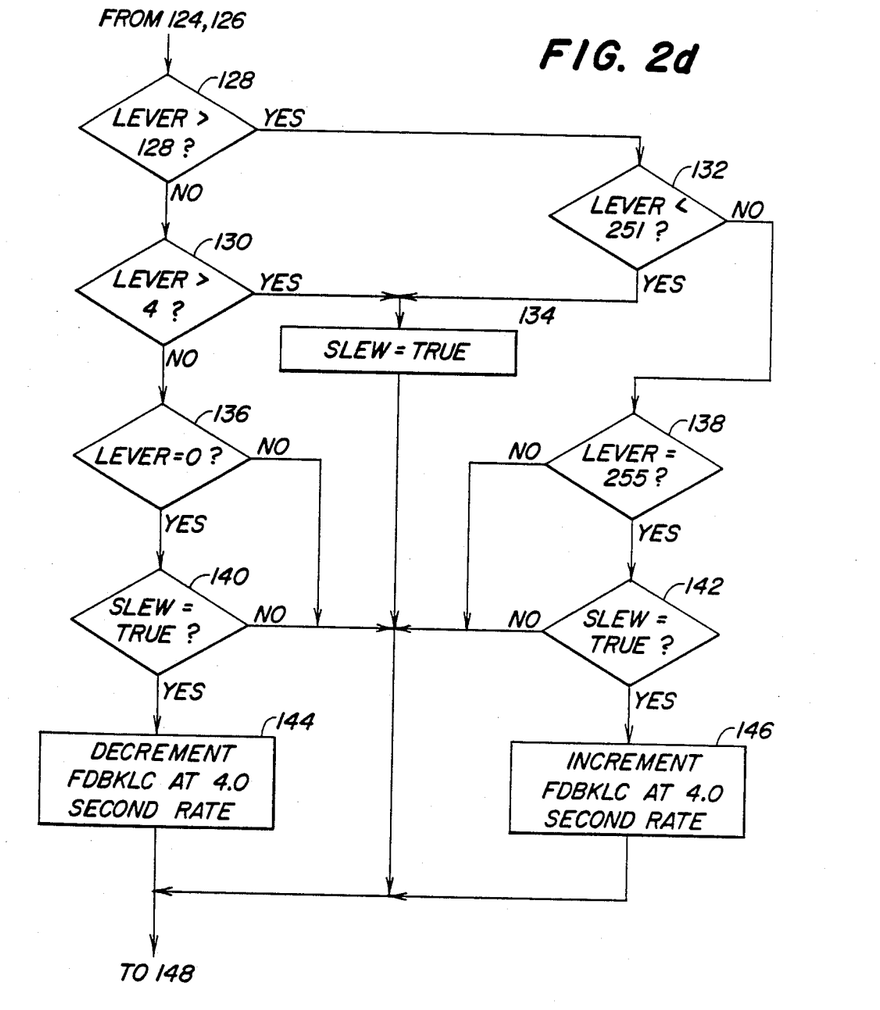

Step 128 determines which stop is nearest to the lever 52. If the lever is nearest to the top stop 55 (LEVER greater than 128), the program will branch to step 132. If not, the program branches to 130. At steps 130 and 132, the program determines if the lever is away from the stops by at least 1.5% (LEVER greater than 4 at the bottom, or LEVER less than 251 at the top). If the lever is away from the stop, the fact is stored in step 134 (SLEW=true) and the program continues to step 148. If the lever is not away from the stops, then the lever position is checked to determine if it is exactly at the stops in step 136 and 138. If the lever is not exactly at either stop, the program continues to step 148. If the lever is at one of the stops, then step 140 or step 142 will determine if the lever had previously been away from that stop (SLEW=true). If so, the start-up position (FDBKLC) will be incremented (step 146) or decremented (step 144) and then the algorithm proceeds to step 148. This will cause a gradual movement of the hitch to a position corresponding to the appropriate stop position 53 or 55. If SLEW is not true, the program will continue without changing the start-up position of the hitch.

Figure 2E:
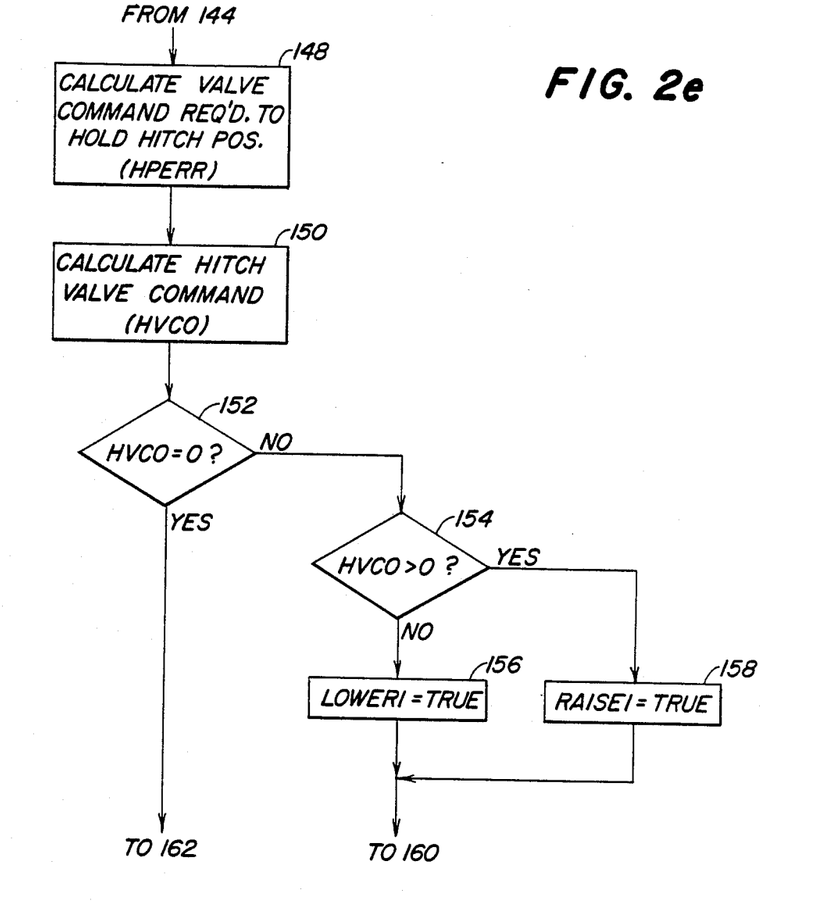

In step 148, the valve command required to hold the hitch in the start-up position is calculated according to the following equation:

$$HPERR=((FDBKLC-FDBK)\times 256 \times G18)/128)-+G19$$

where G18 is a constant reprsenting valve gain (value may range from 26-55) and where G19 is a constant representing valve dead band (typical value approx. 1250). This is essentially the same equation as is used in the normal hitch control algorithm position control mode, except that FDBKLC is substituted for the lever position command value. In step 150, the normal hitch valve command (HVCO) is calculated. This step represents a hitch control algorithm such as described in U.S. Pat. No. 4,518,044.

Figure 2F:
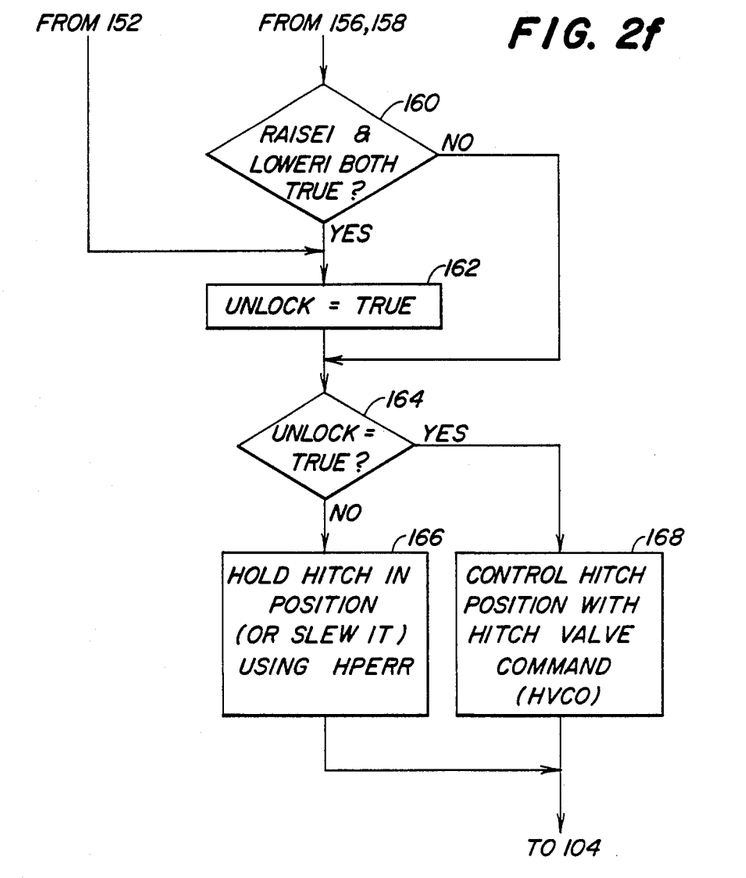

Steps 152 through 162 determine if the hitch can be unlocked. The hitch is unlocked if the normal hitch valve command (HVCO) from step 150 is equal to zero or it has passed through zero since start-up. Step 152 checks for a zero valve command (HVCO=0) and unlocks the hitch (UNLOCK=true, step 162) if it is. Step 154 checks the direction of the hitch command (HVCO greater than 0) and indictes a hitch raise command has taken place (RAISE1=true, step 158) if the pressure valve would be commanded or indicates a hitch lower command has taken place (LOWER1=true, step 156) if the return valve would be commanded. Step 160 then tests to determine if both raise and lower commands have taken place since start-up and unlocks the hitch if so (UNLOCK=true, in step 162).

Step 164 determines which valve command to use to control the hitch. If the hitch is unlocked (UNLOCK=true),the program will branch to step 168 and output the normal hitch valve command (HVCO) from step 150 to the appropriate valve. If the hitch is not unlocked, the program will branch to step 166 and output the valve command necessary to hold the hitch in its start-up position (HPERR), from step 148.

At this point, the program loops back to step 104 to input new data. This loop from step 104 to 166 or 168 will continue as long as power is applied to the hitch control system.

The conversion of the above-described flow chart into a standard language for implementing the algorithm described by the flow chart in a digital data processor such as a microprocessor, will be evident to those with ordinary skill in the art.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a vehicle having connecting means for attaching a ground-penetrating implement thereto and actuating means for raising and lowering the hitch through a range of positions in response to control signals applied to an input thereof, a control system comprising:
   an operator-controlled device for generating a command signal representing a desired characteristic;
   a position sensor for sensing the actual hitch position;
   an operator-controlled limit setter for generating an electrical limit signal distinct from the command signal and representing a desired limit position to the positions occupied by the hitch; and
   means for automatically generating said control signals as a function of the command signal and of a sensed parameter, and including means operable, upon start-up of the control system, to prevent automatic hitch movement until the hitch is manually moved to the limit position as a result of operator movement of the operator-controlled device if, upon start-up, the actual hitch position is beyond the limit position.

2. The control system of claim 1, wherein:
   the actuating means comprises hydraulic devices; and
   the means operable upon start-up comprises means for preventing hitch movement despite hydraulic device fluid leakage.

3. In a vehicle having connecting means for attaching a ground-penetrating implement thereto and actuating means for raising and lowering the hitch through a range of positions in response to control signals applied to an input thereof, a control system comprising:
   an operator-controlled device for generating a command signal representing a desired characteristic;
   a position sensor for sensing the actual hitch position;
   an operator-controlled limit setter for generating an electrical limit signal distinct from the command signal and representing a desired limit position to the positions occupied by the hitch; and
   means for automatically generating said control signals as a function of the command signal and of a sensed parameter, and including means operable upon start-up of the control system to prevent hitch movement until the limit setter is adjusted by the operator so that the limit signal corresponds to actual hitch position if, upon start-up, the actual hitch positions is beyond the limit position.

4. The control system of claim 3, wherein:
   the actuating means comprises hydraulic devices; and
   the means operable upon start-up comprises means for preventing hitch movement despite hydraulic device fluid leakage.

5. In a vehicle having connecting means for attaching a ground-penetrating implement thereto and actuating means for raising and lowering the hitch and implement in response to control signals applied to an input thereof, a control system comprising:
   an operator-controlled device for generating a position signal representing a desired position of the hitch;
   stop means for mechanically preventing movement of the operator-controlled device beyond a stop position;
   a position sensor for sensing hitch position; and
   a control unit for generating said control signals as a function of the position signal and of the sensed hitch position, the control unit including:
   means operable upon start-up of the control system for comparing the position of the operator-controlled device to the stop position for preventing movement of the hitch if the position of the operator-controlled device differs from the stop position and for moving the hitch towards a position corresponding to the stop position after the operator-controlled device is manually moved to the stop position.

6. The control system of claim 5, wherein the control unit further comprises:
   means for moving the hitch to a position corresponding to the stop position if the lever is moved to the stop position from a position away from the stop position.

7. The control system of claim 5, wherein:
   the actuating means comprises hydraulic devices; and
   the means operable upon start-up comprises means for preventing hitch movement despite hydraulic device fluid leakage.

* * * * *